United States Patent [19]

Yamamoto et al.

[11] Patent Number: 4,931,535

[45] Date of Patent: Jun. 5, 1990

[54] PROCESS FOR THE PREPARATION OF ACETAL POLYMER OR COPOLYMER

[75] Inventors: Kaoru Yamamoto; Toshiaki Kitano; Hiroyuki Sano, all of Shizuoka, Japan

[73] Assignee: Polyplastics Co., Ltd., Osaka, Japan

[21] Appl. No.: 346,560

[22] Filed: May 1, 1989

[30] Foreign Application Priority Data

Jun. 13, 1988 [JP] Japan .................................. 63-145445

[51] Int. Cl.$^5$ .............................................. C08G 2/06
[52] U.S. Cl. .................................... 528/230; 528/232; 528/234; 528/245; 528/270; 528/393; 524/406; 524/408; 524/413
[58] Field of Search ............... 528/230, 232, 234, 245, 528/270, 393; 524/406, 408, 413

[56] References Cited

U.S. PATENT DOCUMENTS 4,480,071 10/1984 Natarajan et al. .................. 524/593
4,713,414 12/1987 Kusumgar ........................... 525/154

OTHER PUBLICATIONS

CA 110: 9555g, "UV-Curable Noncrystalline Acetal Copolymer Rubbers."

*Primary Examiner*—John Kight, III
*Assistant Examiner*—S. A. Acquah
*Attorney, Agent, or Firm*—Nixon & Vanderhye

[57] ABSTRACT

Acetal polymer and copolymer are prepared by polymerizing formaldehyde or its cyclic oligomer as a principal monomer, or copolymerizing the principal monomer with a comonomer copolymerizable therewith, using an isopoly acid or an acid salt thereof as a polymerization catalyst.

6 Claims, No Drawings

PROCESS FOR THE PREPARATION OF ACETAL POLYMER OR COPOLYMER

FIELD OF INVENTION

The present invention relates to a process for the preparation of an acetal polymer or copolymer.

More particularly, the present invention relates to a novel process for the preparation of an acetal polymer or copolymer which comprises polymerizing formaldehyde or a cyclic oligomer thereof as a principal monomer, using an isopoly acid or an acid salt thereof as a catalyst.

BACKGROUND AND SUMMARY OF THE INVENTION

Oxyalkylene polymers represented by an oxymethylene polymer comprised mainly of repeating —$CH_2O$— units are well known. In this regard, the processes for the preparation of oxyalkylene polymers according to the prior art can be broadly classified into two types. One main type of prior art process involves polymerizing anhydrous formaldehyde as a principal monomer, while the other main type of prior art process involves polymerizing, as a principal monomer, a cyclic acetal such as trioxane (which is a cyclic trimer of formaldehyde).

It has been proposed with respect to the former process to polymerize or copolymerize substantially anhydrous formaldehyde in the presence of an anionically or cationically active catalyst. On the other hand, it has been proposed with respect to the latter process to polymerize or copolymerize a cyclic acetal (such as trioxane) in the presence of a cationically active catalyst. The catalyst which has been proposed for the above processes includes Lewis acids, particularly, halides of boron, tin, titanium, phosphorus, arsenic or antimony, such as boron trifluoride, tin tetrachloride, titanium tetrachloride, phosphorus pentachloride, phosphorus pentafluoride, arsenic pentafluoride and antimony pentafluoride and complexes and salts thereof; proton acids such as perchloric acid; esters of proton acids, particularly, esters of perchloric acid with lower aliphatic alcohols, such as t-butyl perchlorate; anhydrides of proton acids, particularly, mixed anhydrides of perchloric acid with lower aliphatic carboxylic acids such as acetyl perchlorate; trimethyloxonium hexafluorophosphate, triphenylmethyl hexafluoroarsenate, acetyl tetrafluoroborate, acetyl hexafluorophosphate and acetyl hexafluoroarsenate. Among them, boron fluoride and coordination compounds thereof with organic compounds such as ethers are the most preferred catalysts for the polymerization or copolymerization of a cyclic oligomer of formaldehyde, such as trioxane, and are typically used on an industrial basis. However, polymer prepared by using any of the above noted catalysts has a limited degree of polymerization. Therefore, it is very difficult to prepare a polymer having a degree of polymerization exceeding a certain upper limit according to the prior art.

Furthermore, when a cyclic ether or cyclic formal having two or more adjacent carbon atoms is copolymerized with a principal monomer as described above (i.e., so as to introduce a relatively more stable unit into the polymer's chain) copolymer obtained just after the copolymerization generally has a thermally unstable moiety on its terminal. Thus the copolymer must be stabilized by eliminating the unstable moiety prior to its practical use, thereby necessitating complicated and uneconomical post-treatment. If the content of the unstable moiety in crude acetal copolymer directly obtained by copolymerization is reduced, the final product will thus be more stable and the post-treatment will advantageously be simplified. Thus, a copolymerization process for preparing an acetal copolymer containing a reduced amount of unstable moiety formed during the polymerization process has been desired.

The reason for the above problems with respect to the limitation in the degree of polymerization of an acetal (co)polymer and the presence of a considerable amount of an unstable terminal moiety in acetal copolymer is presumably because the polymerization catalyst as described above not only accelerates the polymerization, but also affects the decomposition and depolymerization. That is, the molecular weight, thermal stability, processability in molding and the color of acetal (co)polymer vary depending upon the kind of the catalyst used. In this regard what has been needed in the art is an acetal polymerized process which uses a polymerization catalyst which overcomes the above problems. It is towards attaining such a process that the present invention is directed.

DETAILED DESCRIPTION OF THE PREFERRED EMBODIMENTS

The present invention broadly relates to a process for the preparation of an acetal polymer or copolymer which comprises polymerizing formaldehyde or a cyclic oligomer thereof alone, or copolymerizing formaldehyde or a cyclic oligomer thereof, as a principal monomer with a comonomer copolymerizable therewith, using an isopoly acid or an acid salt thereof as a polymerization catalyst.

Several advantages ensue by using an isopoly acid or an acid salt thereof as a polymerization catalyst. For example, the homopolymerization of formaldehyde or a cyclic oligomer thereof (such as trioxane) and the copolymerization of formaldehyde or a cyclic oligomer thereof as a principal monomer with a comonomer copolymerizable therewith can be carried out more easily as compared to prior art processing. The resulting polymer will also have a is higher degree of polymerization as compared to polymers prepared using prior art catalysts, even when the amount of the catalyst used is very small. Furthermore, when the copolymerization is carried out according to the present invention, the acetal copolymer that is obtained has a reduced content of unstable terminal moieties. Therefore, the acetal (co)polymer prepared according to the present invention can be applied to a specific uses in which the acetal polymer of the prior art was unsuitable. Thus, the present invention provides an acetal (co)polymer which is applicable to a under field of use.

The isopoly acid to be characteristically used in the present invention as a polymerization catalyst is also called a "homopoly acid" and refers to a high-molecular weight inorganic oxy acid formed by the condensation of an inorganic oxy acid containing only one kind of metal. A salt of an isopoly acid is represented by the general formula: m $M_2^I$O.n $M_2^V$.x $H_2O$ or m $M_2^I$O.n-$M^{IV}O_3$.x$H_2O$, wherein $M^I$ is mainly an alkali metal; $M^V$ is vanadium, niobium or tantalum which is a Group V metal of the periodic table and $M^{VI}$ is chromium, molybdenum, tungsten or uranium which is a Group VI metal thereof. A free isopoly acid can be prepared from a salt thereof as described above by, for example, treating a solution of the salt with an ion exchange resin or by adding a mineral acid to a concentrated solution of the salt and extracting the generated free acid with ether from the resulting mixture. Further, acid salts of an isopoly acid which are obtained by replacing a part or all of the protons of the isopoly acid with various metals may also be used as the catalyst in the present invention.

Particular examples of the isopoly acid that may be used in the present invention include isopolytungstic acids, such as paratungstic and metatungstic acids; isopolymolybdic acids, such as paramolybdic and metamolybdic acids and isopolyvanadic acids. Among these isopolytungstic acids are preferred.

The amount of the isopoly acid or acid salt thereof to be used as a polymerization catalyst varies depending upon the type of catalyst. In addition, the polymerization can also be controlled by changing the amount catalyst that is use. The amount of catalyst used is, however, is generally between 0.1 to 5000 ppm, preferably between 0.2 to 50 ppm, based on the total amount of the monomers to be polymerized. When an isopoly acid having a very high activity is used, such as paratungstic acid, an amount of only between 0.2 to 10 ppm is usually enough to be catalytically effective. The fact that the polymerization or copolymerization can be carried out using a small amount of catalyst is effective in depressing catalyst caused main polymer chain cleavage and/or polymer or depolymerization. As a result, the present invention is economically advantageous.

It is preferable from the standpoint of reaction homogeneity to use an isopoly acid dissolved in an inert solvent which does not exert any adverse effects on the polymerization of formaldehyde or a cyclic oligomer thereof. In this regard, the preferred solvent includes ethers in which an isopoly acid is soluble, particularly n-butyl ether.

The principal monomer according to the present invention is anhydrous formaldehyde or a cyclic oligomer thereof. The oligomer includes trioxane and tetraoxane which are a cyclic trimer of formaldehyde and a cyclic tetramer thereof, respectively. Particularly, trioxane is the most representative monomer used in the polymerization and the copolymerization.

Although the process of the present invention is effective in the homopolymerization of formaldehyde or a cyclic oligomer thereof, it is particularly effective in the copolymerization of formaldehyde or a cyclic oligomer thereof as a principal monomer with a comonomer. Further, the process of the present invention is effective not only in the copolymerization processes of formaldehyde or a cyclic oligomer thereof, such as trioxane, with one comonomer but also in the copolymerization thereof with two or more comonomers. The comonomer includes monomers which give a copolymer having a branched or crosslinked structure. Representative examples of the comonomer to be used in the present invention includes compounds represented by the general formula:

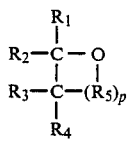
(1)

wherein $R_1$, $R_2$, $R_3$ and $R_4$ may be the same or different from each other and each stand for a hydrogen atom, an alkyl group or a halogen-substituted alkyl group; $R_5$ stands for a methylene or oxymethylene group, an alkyl- or haloalkyl-substituted methylene or oxymethylene group (in these cases, p is an integer of 0 to 3) or a divalent group of $-(CH_2)_q OCH_2-$ or $-(O-CH_2-CH_2)_q OCH_2-$ (in these cases, p is 1 and q is an integer of 1 to 4). The alkyl groups each have 1 to 5 carbon atoms and 1 to 3 hydrogen atoms thereof may be replaced with halogen atoms, particularly chloride atoms.

Particular examples of the compound include epichlorohydrin, ethylene oxide, 1,3-dioxolane, diethylene glycol formal, 1,4-butanediol formal, 1,3-dioxane and propylene oxide. Further, the comonomer includes cyclic esters such as β-propiolactone and vinyl compounds such as styrene and acrylonitrile. Examples of the comonomer which can give a copolymer having a branched or linear structure include alkyl mono (or di-)glycidyl ethers (or formals) such as methyl glycidyl formal, ethyl glycidyl formal, propyl glycidyl formal, butyl glycidyl formal, ethylene glycol diglycidyl ether, triethylene glycol diglycidyl ether and bis(1,2,6-hexanetriol) triformal. Particularly, the advantageous effects of the catalyst according to the present invention are exhibited more effectively in the copolymerization of trioxane as a principal monomer with a cyclic ether or formal such as ethylene oxide, dioxolane or 1,4-butanediol formal as a comonomer.

In the polymerization process of the present invention, a conventional chain transfer agent such as a low-molecular weight linear acetal may be simultaneously used for the purpose of controlling the resulting degree of polymerization of the polymer as may be desired.

The polymerization process of the present invention may be carried out in a similar manner and using similar equipment to the prior art processes for polymerizing formaldehyde or trioxane. That is, the process of the present invention may be carried out in either batchwise or continuous processes using gas phase, solution, melt, melt bulk and solid phase polymerization techniques. Particularly, a process in which a liquid monomer is employed may be used satisfactorily so as to obtain the polymer in the form of a solid powder or lump as the polymerization progresses with the progress of the polymerization is generally employed. If necessary, an inert liquid medium may be used in the process.

The polymerization equipment that may be used to effect batchwise polymerization according to the present invention includes ordinary reaction vessels fitted with a stirrer. On the other hand, the continuous process may be practiced using equipment that includes cokneaders, twin-screw continuous extruders, continuous mixers of the two-shaft paddle type, and others which are typically used for the continuous polymerization of trioxane or the like. Further, combinations of the above-noted equipment may be used is desired.

The polymerization temperature is not particularly limited and varies depending upon the polymerization of the monomer used. When trioxane is polymerized as a principal monomer according to an ordinary bulk polymerization method, the polymerization temperature is between 64° to 120° C. Furthermore, although the polymerization time varies depending upon the amount of the catalyst used and is not particularly limited, it is generally selected within the range of 0.5 to 100 minutes. The polymer discharged from the outlet of the polymerization equipment after the predetermined polymerization time has lapsed is generally in a solid state i.e., in the form of a solid lump or powder. Unreached monomers are partially or completely removed from the polymer. It is then preferable that a catalyst deactivator or a solution thereof be added to the reaction mixture after polymerization so as to neutralize and deactivate the catalyst present therein. Examples of the deactivator include ammonia, amines such as triethylamine and tri-n-butylamine, hydroxides of alkali metal or alkaline earth metals and the like. When the formed polymer is in the form of a large solid lump, it is of course preferred that the lump be polymerized prior to the catalyst deactivation treatment.

The thus treated polymer is then generally subjected to a stabilization treatment. When the polymer is a homopolymer, stabilization is usually attained by converting the terminal group into an ester, ether or urethane group. On the other hand, when the polymer is a copolymer, stabilization is usually attained by melting the copolymer or heating the copolymer in a liquid solvent or nonsolvent medium to thereby selectively decompose and eliminate unstable moieties. In this regard, since the copolymer prepared according to the present invention contains a reduced amount of terminal unstable moieties as compared with prior art acetal copolymers, its stabilization treatment is remarkably simplified, with the obtained final product being highly stable.

As illustrated in the above description and below Examples, the process for the preparation of an acetal polymer or copolymer according to the present invention gives a polymer having an enhanced molecular weight in an enhanced polymerization yield using a very low catalyst level as compared with the prior art acetal processes. Further, when an acetal copolymer is prepared according to the present invention, the copolymer contains a reduced amount of an unstable terminal moieties, so that a final product exhibiting excellent stability after post-treatment the post-treatment itself being economically simplified.

EXAMPLES

The invention is further described by way of the following nonlimiting Examples. The terminology and methods of measurement used in the Examples and Comparative Examples are as follows:

% or ppm: all by weight

Polymerization yield: percentage by weight of the obtained polymer based on the whole monomers used.

Solution viscosity [reduced viscosity]: A polymer was dissolved in 50 g of p-chlorophenol containing 2% of α-pinene. The obtained solution was examined for solution viscosity at 60° C. (evaluated as a characteristic value corresponding to the molecular weight)

Melt index (MI): The melt index (g/10 min) determined at 190° C. is shown. It was evaluated as a characteristic value corresponding to the molecular weight. That is, the lower the MI, the higher the molecular weight. (prior to the measurement of the melt index, a small amount of a certain stabilizer was added to the polymer to thereby inhibit the decomposition thereof during the measurement).

Degree of alkali decomposition (content of unstable moiety): 1 g of a copolymer was added to 100 ml of 50% aqueous methanol containing 0.5% of ammonium hydroxide. The obtained mixture was heated at 180° C. for 45 minutes in a sealed vessel to determine the amount of the formaldehyde formed by the decomposition and dissolved in the liquid medium. The content is shown by percentage based on the copolymer.

Loss in weight on heating: 5 g of a copolymer was pulverized and mixed with a powdery stabilizer mixture comprising 2.2'-methylbenebis(4-methyl-6-t-butylphenol) (0.5% by weight) and dicyandiamide (0.1%). The obtained mixture was heated at 220° C. in the air for 45 minutes to determine the weight loss.

EXAMPLE 1 AND COMPARATIVE EXAMPLE 1

200 ml of a solution of 0.04 g of paratungstic acid in n-butyl ether was fed into a 500-ml separable flask fitted with a gas inlet tube and a stirrer. Formaldehyde gas prepared by the thermal decomposition of α-polyoxymethylene at 180° C. and passed through a trap of −190° C. to carry out the purification was introduced into the flask through the gas inlet tube at a rate of 0.35 g/min, while introducing helium gas thereinto at a rate of 50 ml/min as a carrier. A powdery polymer was immediately formed. After 120 minutes from the initiation of the introduction of formaldehyde, the formed powdery polymer was taken out, washed with acetone and dried to determine the polymerization yield and the reduced viscosity. The results are shown in Table 1.

The same procedure as the one described in Example 1 was repeated except that 0.13 g of boron trifluoride dibutyl etherate was used instead of the paratungstic acid. The results are shown in Table 1.

TABLE 1

| | Polymerization catalyst | Catalyst concentration g/l | Polymerization yield (%) | Reduced viscosity (dl/g) |
|---|---|---|---|---|
| Ex. 1 | paratungstic acid | 0.20 | 77 | 1.68 |
| Comp. Ex. 1 | boron trifluoride dibutyl etherate | 0.65 | 73 | 1.28 |

EXAMPLES 2 AND 3 AND COMPARATIVE EXAMPLE 2

200 g of trioxane was placed in a hermetically sealed autoclave fitted with a jacket for circumlating a heating medium and an agitating blade, followed by stirring. The bulk temperature was kept at about 70° C. by circulating hot water of 70° C. through the jacket. A solution of a catalyst given in Table 2 (an isopoly acid was used as a solution in n-butyl ether, while boron trifluoride dibutyl etherate was used as a solution in cyclohexane) was added so as to give a catalyst concentration (based on the monomer) given in Table 2, thereby initiating the polymerization. After 3 minutes, 300 g of water containing 0.1% of tributylamine was added to the autoclave to stop the reaction. The contents were taken out, pulverized into 200 mesh or smaller, washed with acetone and dried to determine the polymerization yield and the reduced viscosity. The results are shown in Table 2.

TABLE 2

| | Polymerization catalyst | Catalyst* concentration (ppm) | Polymerization yield (%) | Reduced viscosity (dl/g) |
|---|---|---|---|---|
| Ex. 2 | paratungstic acid | 2 | 72 | 2.10 |
| Ex. 3 | paratungstic acid | 4 | 68 | 2.05 |
| Comp. Ex. 2 | boron trifluoride dibutyl etherate | 40 (in terms of BF$_3$) | 63 | 1.75 |

*based on the total amount of the monomer

As shown in Tables 1 and 2, when an isopoly acid was used as a polymerization catalyst, an enhanced polymerization yield was attained on a very low catalyst level and the obtained polymer had an enhanced molecular weight, as compared with the case of using the boron trifluoride dibutyl etherate catalyst according to the prior art.

EXAMPLES 4 TO 7 AND COMPARATIVE EXAMPLE 3

The same polymerization and post-treatment as those described in Example 2 were repeated except that trioxane containing 3.3% of 1,3-dioxolane was used instead of the trioxane monomer and that an isopoly acid (Examples) given in Table 3 or boron trifluoride dibutyl etherate (Comparative Example) was added as a catalyst so as to give a concentration given in Table 3. The characteristics of the obtained polymers are shown in Table 3. It has been confirmed that the use of an isopoly acid as a polymerization catalyst even on a very low level gives a high polymerization yield and that the polymer prepared by using the catalyst has a high molecular weight and excellent resistance to alkali and heat.

EXAMPLE 8 AND COMPARATIVE EXAMPLE 4

The same polymerization and post-treatment as those described in Example 4 were repeated except that 1,4-butanediol formal was used as a comonomer instead of the 1,3-dioxolane. Separately, as Comparative Example, the same procedure as the one described in Example 8 was repeated except that boron trifluoride dibutyl etherate was used as a catalyst. The results are shown in Table 3. The results were nearly equal to those obtained in the abovementioned Examples and Comparative Example.

EXAMPLES 9 AND 10 AND COMPARATIVE EXAMPLE 5

A continuous mixing reactor which comprises a barrel having a section comprising two circles each having an inner diameter of 80 mm and partially overlapping each other and an effective length of 1.3 m and fitted with a jacket for passing a heating medium on the outer surface thereof and two rotating shafts fitted with many paddles was used. Hot water of 80° C. was passed through the jacket and the shafts were rotated in the directions different from each other at a rate of 100 rpm. Trioxane containing 3.3% of 1,3-dioxolane was continuously fed into one end of the reactor at a rate of 10 kg/hr, while continuously feeding a catalyst given in Table 4 so as to give a concentration given in Table 4. Thus, the copolymerization was carried out. The reaction mixture discharged from the other end of the reactor was immediately thrown into water containing 0.1% of triethylamine to deactivate the polymerization catalyst. The polymer was dried. The characteristics thereof are shown in Table 4. According to such a continuous polymerization method as well as a batchwise method using an autoclave or the like, a copolymer which has an enhanced degree of polymerization and is superior in resistance to alkali and heat was obtained in an enhanced polymerization yield by using an isopoly acid as a catalyst even on a very low level, as compared with the case of using the boron trifluoride dibutyl etherate catalyst of the prior art.

TABLE 4

| | Polymerization catalyst | Catalyst* concentration (ppm) | Comonomer | Polymerization yield (%) | MI (g/10 min) | Degree of alkali decomposition (%) | Loss in weight on heating (%) |
|---|---|---|---|---|---|---|---|
| Example 9 | paratungstic acid | 2 | 1,3-dioxolane | 74 | 4.7 | 2.0 | 2.2 |
| Example 10 | metatungstic acid | 4 | " | 73 | 4.8 | 2.1 | 2.3 |
| Comparative Example 5 | boron trifluoride butyl etherate | 40 (in terms of BF$_3$) | " | 66 | 7.0 | 3.9 | 4.1 |

*based on the trioxane

We claim:

1. A process for the preparation of an acetal polymer or copolymer which comprises polymerizing formaldehyde or a cyclic oligomer thereof as a principal monomer, or copolymerizing said principal monomer with a comonomer copolymerizable therewith, using an isopoly acid or an acid salt thereof as a polymerization catalyst.

TABLE 3

| | Polymerization catalyst | Catalyst* concentration (ppm) | Comonomer | Polymerization yield (%) | MI (g/10 min) | Degree of alkali decomposition | Loss in weight on heating (%) |
|---|---|---|---|---|---|---|---|
| Example 4 | paratungstic acid | 2 | 1,3-dioxolane | 71 | 5.6 | 4.6 | 4.7 |
| Example 5 | " | 4 | " | 78 | 5.8 | 4.7 | 4.8 |
| Example 6 | metatungstic acid | 4 | " | 65 | 6.0 | 4.8 | 4.9 |
| Example 7 | " | 8 | " | 68 | 6.1 | 4.9 | 4.9 |
| Comparative Example 3 | boron trifluoride dibutyl etherate | 40 (in terms of BF$_3$) | " | 62 | 8.3 | 7.1 | 7.2 |
| Example 8 | paratungstic acid | 2 | 1,4-butanediol formal | 70 | 5.9 | 4.7 | 4.9 |
| Comparative Example 4 | boron trifluoride dibutyl etherate | 40 (in terms of BF$_3$) | 1,4-butanediol formal | 60 | 8.5 | 7.4 | 7.6 |

*based on the trioxane

2. A process for the preparation of an acetal polymer or copolymer as set forth in claim 1, wherein said isopoly acid is an isopoly acid of tungsten.

3. A process for the preparation of an acetal polymer or copolymer as set forth in claim 1 or 2, wherein said isopoly acid is one or more members selected from the group consisting of paratungstic acids and metatungstic acids.

4. A process for the preparation of an acetal polymer or copolymer as set forth in claim 1, wherein said isopoly acid is used in an amount of 0.1 to 5000 ppm by weight based on the total amount of the monomers used.

5. A process for the preparation of an acetal polymer or copolymer as set forth in claim 1, wherein said principal monomer is trioxane.

6. A process for the preparation of an acetal copolymer as set forth in claim 1, wherein said principal monomer is trioxane and said comonomer is a cyclic ether or a cyclic formal.

* * * * *

UNITED STATES PATENT AND TRADEMARK OFFICE
CERTIFICATE OF CORRECTION

PATENT NO. : 4,931,535

DATED : June 5, 1990

INVENTOR(S) : Yamamoto et al

It is certified that error appears in the above-identified patent and that said Letters Patent is hereby corrected as shown below:

Column 2, line 45, after "a" delete "is";
         line 56, after "to", delete "a under field" and insert
         --several fields--.

Column 3, line 21, after "however," delete "is";
         line 29, after "catalyst" insert a hyphen (-);
         line 30, after "/or" delete "polymer or".

Column 4, line 46, after "progresses" delete "with the progress of the pol-";
         line 47, delete "ymerization".

Column 5, line 4, delete "reached" and insert --reacted--;
         line 13, after "be" delete "polymerized" and insert --pulverized--;
         line 37, after "of" delete "an";
         line 39, after "treatment" insert --is achieved with--.

Column 6, line 7, after "in" delete "the".

Column 7, line 3, after "attained" delete "on" and insert --at--;
         line 47, after "above" and before "mentioned" insert a hyphen (-).

Signed and Sealed this

Twenty-eighth Day of January, 1992

Attest:

HARRY F. MANBECK, JR.

Attesting Officer      Commissioner of Patents and Trademarks